UNITED STATES PATENT OFFICE.

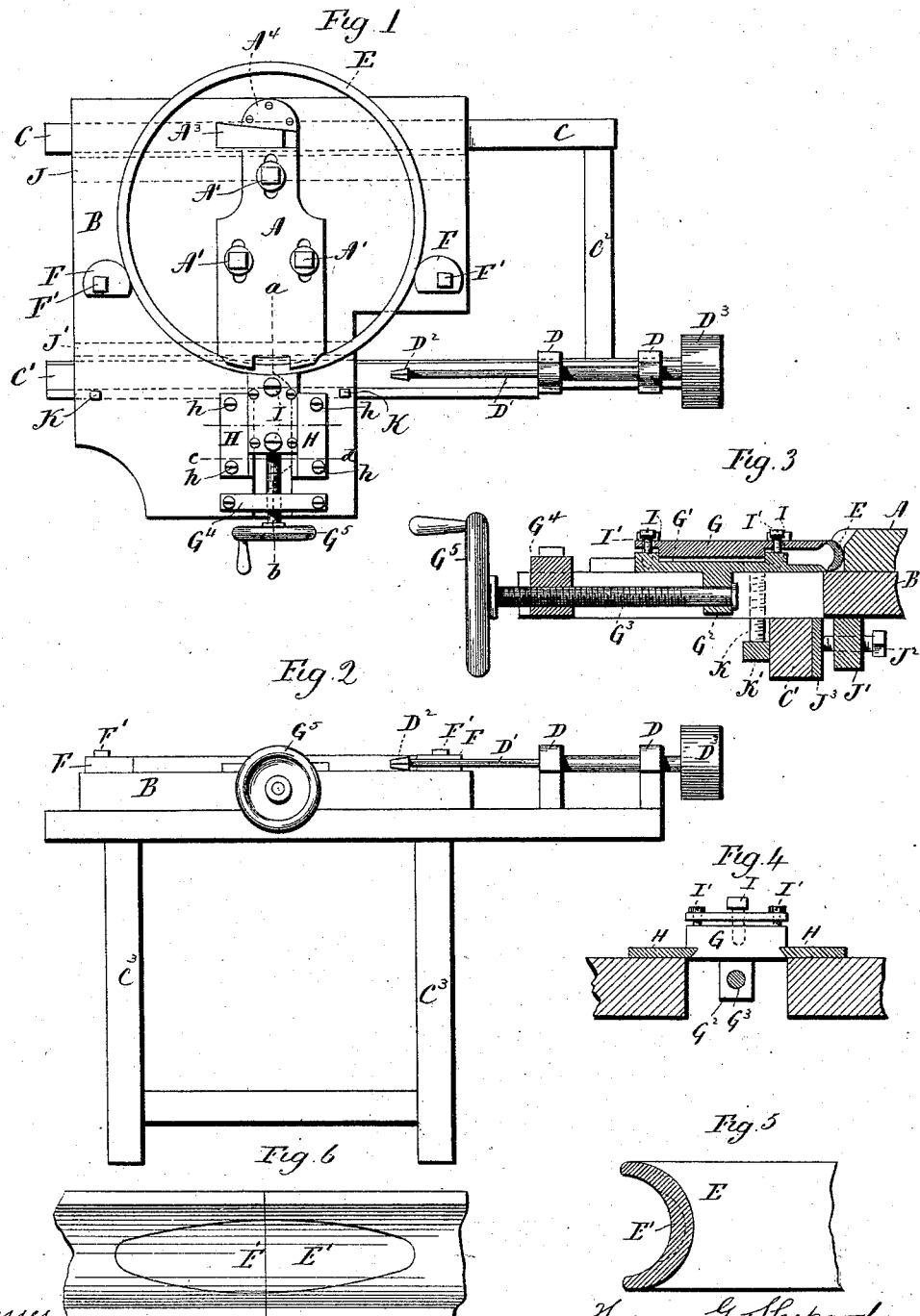

HARVEY G. SHEPARD, OF NEW HAVEN, CONNECTICUT, ASSIGNOR TO H. G. SHEPARD & SONS, OF SAME PLACE.

MACHINE FOR RECESSING WHEEL-RIMS.

SPECIFICATION forming part of Letters Patent No. 540,074, dated May 28, 1895.

Application filed May 14, 1894. Serial No. 511,162. (No model.)

*To all whom it may concern:*

Be it known that I, HARVEY G. SHEPARD, of New Haven, in the county of New Haven and State of Connecticut, have invented a new Improvement in Machines for Recessing Wheel-Rims; and I do hereby declare the following, when taken in connection with the accompanying drawings and the letters of reference marked thereon, to be a full, clear, and exact description of the same, and which said drawings constitute part of this specification, and represent, in—

Figure 1, a plan view of a machine constructed in accordance with my invention; Fig. 2, a view thereof in front elevation; Fig. 3, a view of the machine in vertical section on the line $a\ b$ of Fig. 1; Fig. 4, a view of the machine in transverse section on the line $c\ d$ of said figure; Fig. 5, a sectional view of the wheel-rim, showing by broken lines the recess formed by my machine; Fig. 6, a plan view of the abutting ends of the wheel-rim after they have been recessed.

My invention relates to an improved machine for peripherally recessing wheel-rims, preparatory to the reception of a joint-piece uniting their abutted ends, the object being to produce a simple, convenient and effective machine for the purpose.

With these ends in view, my invention consists in a machine having certain details of construction and combinations of parts as will be hereinafter described and pointed out in the claims.

In carrying out my invention, I locate a head-block A upon a table B, adapted to be moved laterally and longitudinally upon two horizontal frame-pieces C C', united at one end by a cross-piece $C^2$, and supported upon uprights, of which two, $C^3\ C^3$ are shown in Fig. 2. The front frame-piece C' carries two boxes D D, in which a shaft D', furnished with a rotary cutter $D^2$ is mounted, the projecting outer end of the said shaft being provided with a pulley $D^3$, receiving a belt driven from any convenient source of power. The head-block A is secured to the table B, by means of three bolts A' A' A', passing through elongated holes in the block, which is adjusted forward by means of a wedge $A^3$ interposed between its rear end, and a small fixed block $A^4$. The forward end of the head-block is conformed in curvature to the curvature of the inner periphery of the wheel-rim E, to be recessed by the machine, the center of the said edge of the block being centrally cut away to form an observation opening $a$, through which the abutting ends of the rim may be observed.

For the purpose of clamping the rims upon the table, I employ two cams F F, each provided with an eccentrically arranged handle F' F'. It will be understood, however, that the particular construction of these holding devices may be varied. The forward portion of the table B is provided with a pair of movable jaws G and G', the inner ends of which are separated sufficiently to adapt them to engage with the opposite edges of the wheel-rim, as shown in Fig. 3, the separation of the jaws permitting the rotary cutter to pass between them. It will be observed that these jaws are arranged in line with the head-block, and that both the jaws and head-block are arranged at a right angle to the rotary cutter $D^2$. The lower jaw G' is furnished with a depending lug $G^2$, which receives the inner end of a horizontally arranged adjusting-screw $G^3$, mounted in a box $G^4$, secured to the table B, and furnished at its outer end with a hand-wheel $G^5$, by means of which the said jaws are moved back and forth, according to the direction in which it is turned. Two guide-plates H H secured to the table by screws $h$, take into the opposite sides of the lower jaw G', and guide the same. The said jaws are secured together by means by heavy set-screws I I, and adjusted by means of four adjusting-screws I' I' mounted in the upper jaw, and impinging upon the lower edge, as shown in Fig. 3, which shows how the upper jaw fits into the lower jaw. The lower face of the table B, is provided with two bars or stops J J', arranged parallel with each other, and respectively adjacent to the two parallel frame-pieces C C', but having less separation than the said frame-pieces, so as to permit the lateral movement of the table B upon them, the said lateral movement of the table being gaged by adjusting-screws $J^2$ mounted in the bar J' and extending forward for engagement with a metal wearing-plate $J^3$, which faces the inner face of the frame-piece C', as shown in Fig. 3. Two adjusting-screws K, vertically arranged in the forward end of the table, impinge at their lower ends upon a ledge K' applied to the outer face of the frame-piece C'. These screws are employed when it is desired to tilt the table, which may sometimes be convenient.

In using my improved apparatus, I first place a rim upon the table, and clamp it in place by means of the cams F F, with its ends abutted in the center of the curved outer face of the fixed head-block A. The two jaws G G' are then moved inward by means of the hand-wheel $g^5$, until their inner ends engage with the opposite edges of the abutting ends of the rim on opposite sides of the joint, so as to hold the said ends of the rim firmly against the forward end of the head-block. The table is then moved laterally rearward until its bar J engages with the frame-piece C, after which it is moved longitudinally on the said pieces so as to cause the cutter to partially cut the recess E' in the abutting ends of the rim, as shown in Figs. 5 and 6. The table is then moved back to its starting position, and drawn forward until the adjusting screws $J^2$ in the bar J' engage with the wearing-plate $J^3$, after which the plate is moved toward the cutter again, which this time makes a deeper cut and completes the recess E'. The cams F F are then operated to release the rim which is replaced by another, and so on. The long oval recess E' thus formed, is divided equally between the two abutting ends of the rim, and is designed to receive a joint-piece of corresponding form, but not herein shown.

It will be understood that my improved device is adapted in its adjustment to receive rims of different sizes, and to make a recess of more or less depth as required. It is apparent furthermore that some changes may be made in its construction without departing from my invention, and I would therefore have it understood that I do not limit myself to the exact construction shown and described, but hold myself at liberty to make such alterations as fall within the spirit and scope of my invention.

The wheel-rim shown in Figs. 5 and 6, has been made the subject of an application filed January 24, 1894, serially numbered 497,871, and is not claimed herein.

Having fully described my invention, what I claim as new, and desire to secure by Letters Patent, is—

1. In a machine for recessing wheel-rims, the combination with a longitudinally movable table, of a head-block mounted thereupon, means mounted upon the table for clamping a wheel rim thereto, a pair of jaws having their inner ends separated for engaging with the opposite edges of the wheel-rim and forcing the same against the head-block, means for operating the said jaws, and a rotary cutter arranged at a right angle to the jaws which it is permitted to pass between by the separation of their inner ends, which also permits the cutting of the wood by the cutter at a point between the points engaged by their said ends, substantially as described.

2. In a machine for recessing wheel-rims, the combination with a table, of a head-block secured thereto, having its outer end conformed in curvature to the curvature of the rims to be recessed, means for holding a rim with its abutting ends against the said curved end of the head-block, a pair of movable jaws mounted upon the table and having their inner ends separated for engaging with the opposite edges of the wheel-rim which they force against the curved portion of the head-block, and a rotatable cutter arranged at a right angle to the said jaws which it is permitted to pass between by the separation of their inner ends, which also permits the cutting of the wood by the cutter at a point between the points engaged by the jaws, substantially as described.

3. In a machine for recessing wheel-rims, the combination with a longitudinally and laterally movable table, of a head-block fixed thereto, means for securing a wheel-rim upon the table with its abutting ends engaged with the head-block, a pair of movable jaws fixed to the table, and having their inner ends separated to engage with the opposite edges of a rim mounted thereupon, and a rotary cutter arranged at a right angle to the said jaws, which it is permitted to pass between by the separation of their inner ends, which also permits cutting of the wood by the cutter at a point between the points engaged by the said jaws, substantially as described.

4. In a machine for recessing wheel-rims, the combination with a longitudinally movable table, of a head-block mounted thereupon and adapted to form a bearing for the abutting ends of a wheel-rim, and cut away to expose the same for observation, means mounted upon the table for securing the wheel-rim thereto with its ends bearing on the block, jaws mounted upon the table, and having their inner ends separated to engage with the opposite edges of the abutting ends of the rim which they press against the head-block, means for operating the said jaws, and a rotary cutter arranged at a right angle to the jaws, which it is permitted to pass between in the separation of the same, which also permits the wood to be cut away by the cutter at a point between the points engaged by the jaws, substantially as described.

5. In a machine for recessing wheel-rims, the combination with a longitudinally movable table, of a head-block mounted thereupon, a pair of movable jaws having their inner ends separated for engagement with the opposite edges of the abutting ends of the wheel-rim which they force against the head-block, one of the said jaws being movable toward and away from the other to vary their separation to conform to the width of the rims to be recessed, means for operating the said jaws back and forth toward and away from the head-block, and a rotary cutter arranged at a right angle to the jaws, which it is permitted to pass between by the separation of their inner ends, which also permits the wood to be cut away with the cutter at a point between the points engaged by the jaws, substantially as described.

6. In a machine for recessing wheel-rims, the combination with a longitudinally and laterally movable table, of a head-block mounted thereupon, a pair of movable jaws mounted upon the table, and having their inner ends separated for engagement with the opposite edges of the abutting ends of the rim which they force against the head-block, a rotary cutter arranged at a right angle to the jaws, which it is permitted to pass between by their separation, which also permits the wood to be cut away by the cutter at a point between the points engaged by the jaws, and two stops for limiting the lateral movement of the table, one of the said stops being provided with adjusting screws for varying the range of such movement, substantially as described.

7. In a machine for recessing wheel-rims, the combination with a table, of a head-block mounted thereupon, movable jaws also mounted upon the table and having their inner ends separated for engaging with the opposite edges of a wheel-rim which they force against the block, a rotary cutter located at a right angle to the jaws, which it is permitted to pass between by their separation, which also permits the wood between the jaws to be cut away by the cutter at a point between the jaws, and means for tilting the table vertically, substantially as described.

In testimony whereof I have signed this specification in the presence of two subscribing witnesses.

HARVEY G. SHEPARD.

Witnesses:
GEO. D. SEYMOUR,
J. H. SHUMWAY.